US007953012B2

(12) United States Patent
Takahashi et al.

(10) Patent No.: US 7,953,012 B2
(45) Date of Patent: *May 31, 2011

(54) MONITORING ARRANGEMENTS, HAVING COMMUNICATION ESTABLISHMENT INFORMATION CHANGED FROM INITIAL COMMUNICATION ESTABLISHMENT INFORMATION

(75) Inventors: Ichiro Takahashi, Inzai (JP); Seigo Kurokawa, Narashino (JP); Manabu Fujimoto, Sakai (JP)

(73) Assignee: Hitachi Industrial Equipment Systems Co., Ltd., Chiba (JP)

( * ) Notice: Subject to any disclaimer, the term of this patent is extended or adjusted under 35 U.S.C. 154(b) by 121 days.

This patent is subject to a terminal disclaimer.

(21) Appl. No.: 12/420,353

(22) Filed: Apr. 8, 2009

(65) Prior Publication Data

US 2009/0196402 A1    Aug. 6, 2009

Related U.S. Application Data

(63) Continuation of application No. 10/870,933, filed on Jun. 21, 2004, now Pat. No. 7,518,999.

(30) Foreign Application Priority Data

Jun. 20, 2003 (JP) ................................ 2003-175685

(51) Int. Cl.
*G01R 31/08* (2006.01)
*G06F 15/16* (2006.01)
*G06F 15/173* (2006.01)
*H04Q 1/30* (2006.01)
*G08B 21/00* (2006.01)

(52) U.S. Cl. ........ 370/241; 709/203; 709/223; 340/531; 340/679

(58) Field of Classification Search ........................ None
See application file for complete search history.

(56) References Cited

U.S. PATENT DOCUMENTS

| 7,075,425 B2 | 7/2006 | Capano et al. |
| 2002/0049693 A1 | 4/2002 | Gase |
| 2002/0158758 A1 | 10/2002 | Iwasaki et al. |
| 2002/0158759 A1 | 10/2002 | Kaneko et al. |
| 2005/0080884 A1 | 4/2005 | Siorpaes et al. |

FOREIGN PATENT DOCUMENTS

| CN | 1152160 | 6/1997 |
| CN | 1411234 | 4/2003 |
| JP | 8-18572 | 1/1996 |
| JP | 2001-320494 | 11/2001 |
| JP | 2002-297702 | 10/2002 |

*Primary Examiner* — Seema S Rao
*Assistant Examiner* — Christine Duong
(74) *Attorney, Agent, or Firm* — Antonelli, Terry, Stout & Kraus, LLP.

(57) ABSTRACT

This present invention simplifies the installation work, the initialization, the operation confirmation, and the test run work of a monitor terminal in a field site that monitors a monitor object. Communication information and management information, such as a telephone number used to communicate with a communication terminal in a field site at test run time, are integrated. For example, the common values (default values) are set in the communication terminal, which will communicate with a monitoring apparatus, as communication information (IP address, user ID, password) to allow the monitoring apparatus to communicate with the communication terminal by setting only the telephone number of the communication terminal in the monitoring apparatus. During a test run, the monitoring apparatus performs operation to change the communication information and the management information in the communication terminal to the information suitable for a production run.

10 Claims, 7 Drawing Sheets

MONITORING ARRANGEMENTS, HAVING COMMUNICATION ESTABLISHMENT INFORMATION CHANGED FROM INITIAL COMMUNICATION ESTABLISHMENT INFORMATION

CROSS REFERENCE TO RELATED APPLICATION

This is a continuation of U.S. application Ser. No. 10/870,933, filed Jun. 21, 2004 now U.S. Pat. No. 7,518,999. This application relates to and claims priority from Japanese Patent Application No. 2003-175685, filed on Jun. 20, 2003. The entirety of the contents and subject matter of all of the above is incorporated herein by reference.

BACKGROUND OF THE INVENTION

This invention relates to a technology for monitoring and controlling a water/sewerage supply and distribution facility, an industrial production facility, and a sales data collection facility.

Conventionally, a system for monitoring a facility through communication between terminals and a monitoring apparatus is known.

When monitoring sewerage drainage machines, the so-called manhole pumps, a monitoring apparatus for monitoring the manholes is installed in the facility where the manholes are installed.

Before integrated monitoring is actually started using a communication terminal installed on the manhole control panel in the field site and the monitor center in the central site, it is necessary, after the installation work, to initialize and test run the communication function and the communication operation to check whether the monitoring or control operation is performed according to the specifications through the communication between the communication terminal in the field site and the monitoring apparatus in the central site.

The communication setting of a terminal that is monitored and controlled remotely is described in JP-A-08-18572.

Although JP-A-08-18572 discloses a method for changing the address of a terminal that is monitored and controlled remotely, this invention assumes that communication is already performed normally between the monitoring apparatus and a communication terminal.

Therefore, no disclosure is made for an improvement in the initialization of the communication function and the communication operation between a communication terminal in the field site and the monitoring apparatus in the central site after the installation work described above.

One of the conventional problems is that the amount of work required at a trial operation time for starting the operation of such a monitor system is very large and therefore the cost of building a monitor system is increased.

SUMMARY OF THE INVENTION

The problems with the prior art described above are as follows.

First, the management of information for managing date, such as telephone numbers for communicating with communication terminals in the field site is complex.

To be able to communicate with the monitoring apparatus in the central site after a communication terminal is installed in a manhole in the field site, the initialization of the communication conditions is complex. For example, when communication terminals are installed in a plurality of manholes, the telephone numbers, terminal numbers, IP addresses, user IDs, and passwords for identifying the communication terminals in the sites must be correctly stored separately.

When the management information for identifying a communication terminal installed in a field site is incorrectly stored, the central site cannot establish a communication at the initialization time with a communication terminal with which the central site wants to communicate. Another potential problem is that, even when a communication is established successfully and the monitoring apparatus and a communication terminal can communicate with each other, a problem will sometimes arise when the communication terminal with which the monitoring apparatus in the central site is communicating is not an intended communication terminal.

Based on the foregoing, it is an object of this invention to simplify the installation work, initialization, operation confirmation, and test run work.

In view of the problems described above, this invention provides the following solutions.

The communication information, such as telephone numbers, and the management information for use in communication with communication terminals in the field site are integrated at test run time and, during the test run, the monitoring apparatus changes the communication information and the management information to the information suitable for the production run.

Before communicating with the monitoring apparatus, the common values (default values) are set in a communication terminal as the communication information (such as IP address, user ID, and password), and the system is set up so that, when only the telephone number of the communication terminal is set in the monitoring apparatus, the monitoring apparatus and the communication terminal can communicate with each other. As a result, the monitoring apparatus references the communication information including common values (such as IP address, user ID, password) at a test run time to establish a communication with the communication terminal. This eliminates the need for the operator in the field site to set up the communication information and therefore reduces the manpower for a trial operation.

As described above, this invention simplifies the work, such as installation work, the initialization, the operation confirmation, and the test run of monitor terminals.

Other objects, features and advantages of the invention will become apparent from the following description of the embodiments of the invention taken in conjunction with the accompanying drawings.

DESCRIPTION OF THE EMBODIMENTS

An embodiment of the present invention will be described below with reference to the drawings.

Figure 1:
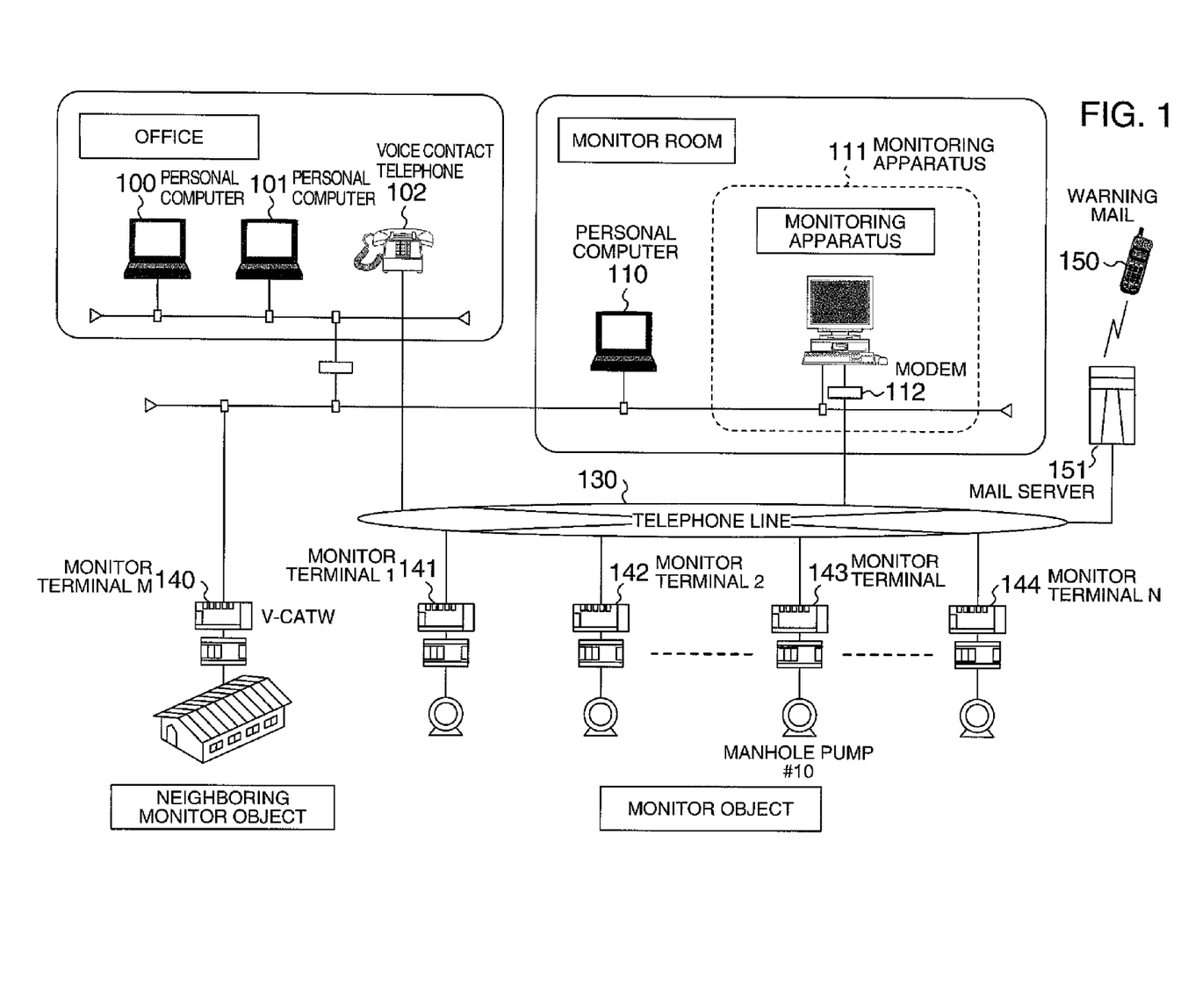
FIG. 1 shows the general configuration of one embodiment of this invention.

FIG. 1 is a diagram showing the general configuration of an embodiment.

Figure 2A:
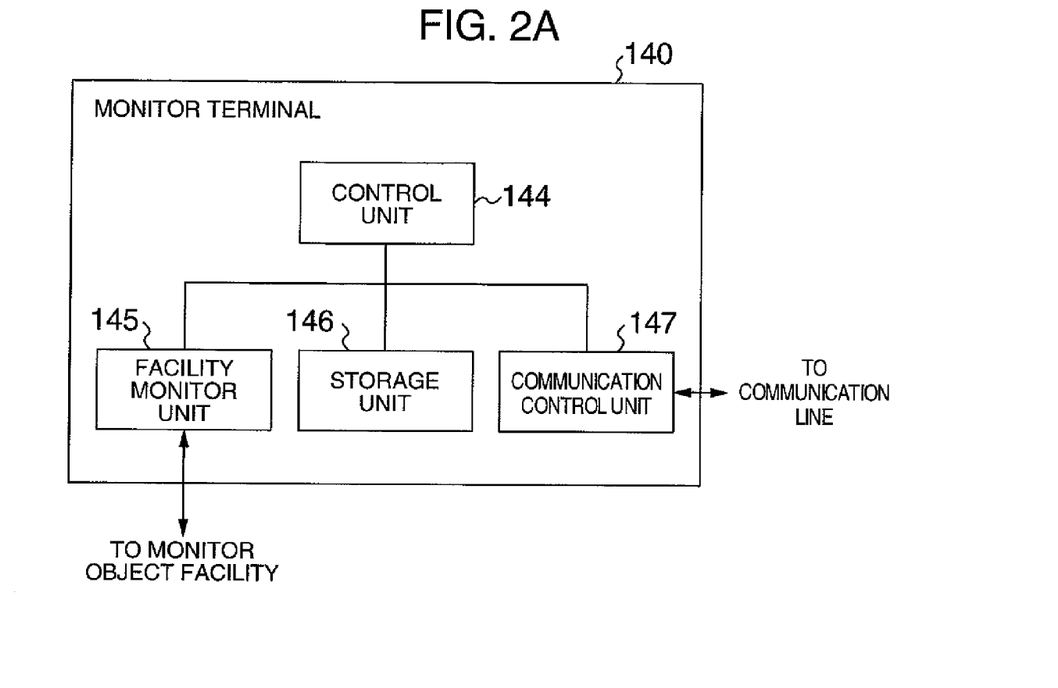
FIG. 2A shows the configuration of a monitor terminal and FIG. 2B shows the configuration of a monitoring apparatus.
Figure 2B:
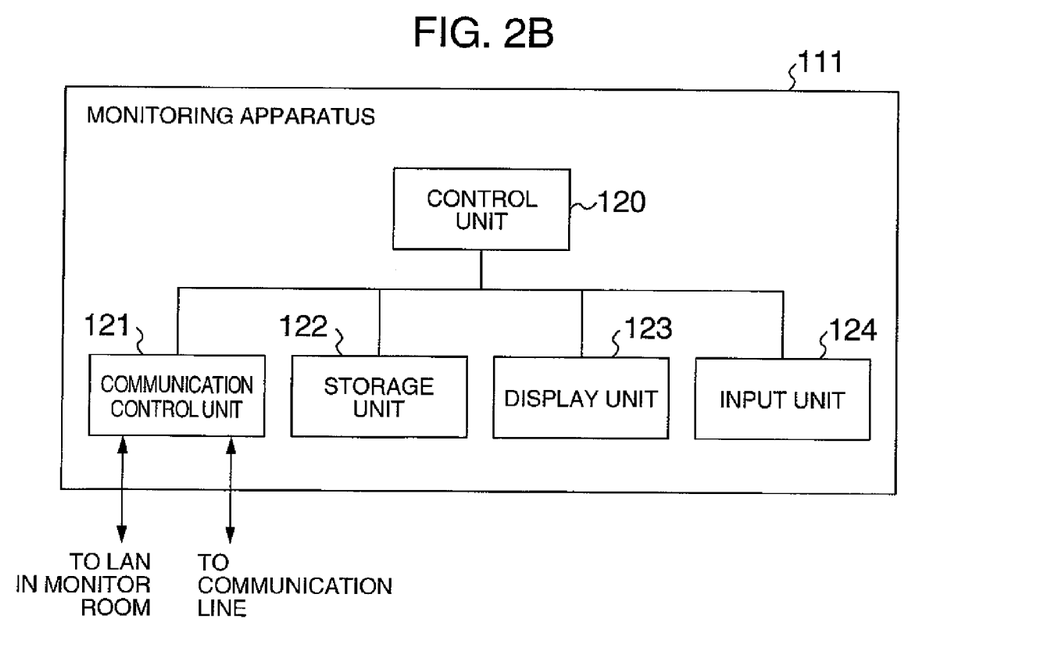

Referring to FIG. 1, a personal computer 110 and a monitoring apparatus 111 are installed in a monitor room, and the monitoring apparatus 111 communicates with a monitor terminal 140, which monitors a monitor object, via LAN (Local area network) and monitoring terminals 141-144 via a telephone line 130. Personal computers 100 and 101 and a telephone 102 that acts as the contact phone are installed in an office. A warning mail is sent to a terminal 150 via a mail server 151 connected to the telephone line 130. FIG. 2A shows the configuration of the monitor terminal 140, and FIG. 2B shows the configuration of the monitoring apparatus 111.

The monitor terminal 140 in FIG. 2A comprises a control unit 144, a facility monitor unit 145, a storage unit 146, and a communication control unit 147. The control unit 144, which has a CPU, controls the functions of the components of the monitor terminal 140. The facility monitor unit 145 is a circuit that captures the operation signal obtained from the facility of a monitor object. There are two types of operation signal. One is a contact signal having the value of on or off to indicate that the signal is a normal operation signal or an error signal and the other is an analog signal having the value of an analog signal value. The facility monitor unit 145 captures these data and converts them so that the software operating in the control unit 144 can handle the signals.

The storage unit 146 saves therein the initial setting values that are set in the monitor terminal 140 and the operation history data on the facility of a monitor object. In this embodiment, a flash memory is used so that the data saved in the storage unit 146 is not be lost even when the power is turned off. The software in the control unit 144 processes the signal obtained from the facility monitor unit 145 to create the operation history data and saves the created operation history data in the storage unit 146.

The communication control unit 147 comprises communication parts for communicating with the monitoring apparatus 111. In this embodiment, the communication control unit 147 comprises three circuits including a modem, a circuit for connection to Ethernet® and an RS232C circuit. The modem is used when the monitor terminal 140 uses the telephone line, while the circuit for Ethernet® is used when the monitor terminal 140 connects to Ethernet® or a router. When there is a modem specific to the communication line for connection to a non-telephone line, the RS232C circuit is used. The monitoring apparatus 111 and the monitor terminal 140 communicate with each other via the communication control unit 147. Through this communication, warning data is sent or an operation history is sent from the monitor terminal 140 to the monitoring apparatus 111.

Referring to FIG. 2B, the monitoring apparatus 111 comprises a control unit 120, a communication control unit 121, a storage unit 122, a display unit 123, and an input unit 124.

The control unit 120, which has a CPU, performs operation based on the software.

The communication control unit 121 has two types of circuit including an RS232C port to which a modem is connected and a circuit for Ethernet for connection to a LAN in the monitor room. The monitoring apparatus 111 uses the modem to connect to a communication terminal to obtain warning data and operation history data.

The storage unit 122 saves therein data that the software in the control unit 120 obtains from the communication control unit 121 or saves history data indicating the operation of the operator of the monitoring apparatus 111. In this embodiment, a hard disk is used.

The display unit 123 is a part on which data created by the monitoring apparatus 111 is displayed. When warning data is received from the monitor terminals 140-144 via the communication control unit 121, the control unit 120 displays the warning contents on the display unit 123 based on the software. The monitoring apparatus 111 also displays the operation history, which is received from the monitor terminals 140-144 and saved in the storage unit 122, on the display unit 123. In particular, the monitoring apparatus 111 in this embodiment has the function of automatically initializing a communication terminal, the control unit 120 has the function of displaying a message on the display unit 123 to indicate whether or not the initialization has succeeded or failed.

The input unit 124 is a part used by the operator to operate the monitoring apparatus 111. In this embodiment, a mouse and a keyboard are used as the input unit 124.

Depending upon the way the monitoring apparatus 111 is configured, a personal computer other than the main body of the monitoring apparatus 111 may have the function of the display unit 123 and the input unit 124. In FIG. 1, the personal computer 110 is connected to the monitoring apparatus 111 via the LAN. The personal computer can display data created by the monitoring apparatus 111 and allows the user to operate the monitoring apparatus 111. That is, with server software for a browser running on the monitoring apparatus 111 and with a browser running on the personal computer 110, the data saved in the monitoring apparatus 111 can be displayed on the personal computer 110. In addition, the user can operate the software on the monitoring apparatus 111 via the browser on the personal computer 110. In particular, when initializing a monitor terminal, the user can set a telephone number and perform the initialization start operation on the personal computer 110 to cause the software running on the monitoring apparatus 111 to execute the initialization.

Next, the procedure at initialization will be described with reference to FIG. 1 and FIG. 3.

In the description below, the numerals are those used in FIG. 1, and (step 1) to (step 14) are those shown in FIG. 3.

(Step 1) When the user performs operation to acquire data on a manhole pump #10 143, the user's monitoring apparatus 111 issues a request to connect to the specified telephone number of the monitor terminal of the manhole pump #10 143 via the telephone line network 130.

(Step 2) Upon completion of reception and connection in response to the connection request from the user's monitoring apparatus 111, the monitor terminal 143 issues a reception and connection completion response to the user's monitoring apparatus 111.

(Step 3) The user's monitoring apparatus 111 sends the user ID/password to the monitor terminal 143.

(Step 4) The monitor terminal 143 checks the user ID/password sent from the monitoring apparatus 111, compares them with those registered in advance, and disconnects the line forcibly when the received user ID/password do not match those registered. On the other hand, when the user ID/password match those registered, the monitor terminal 143 performs authentication and establishes a network (532).

Figure 3:
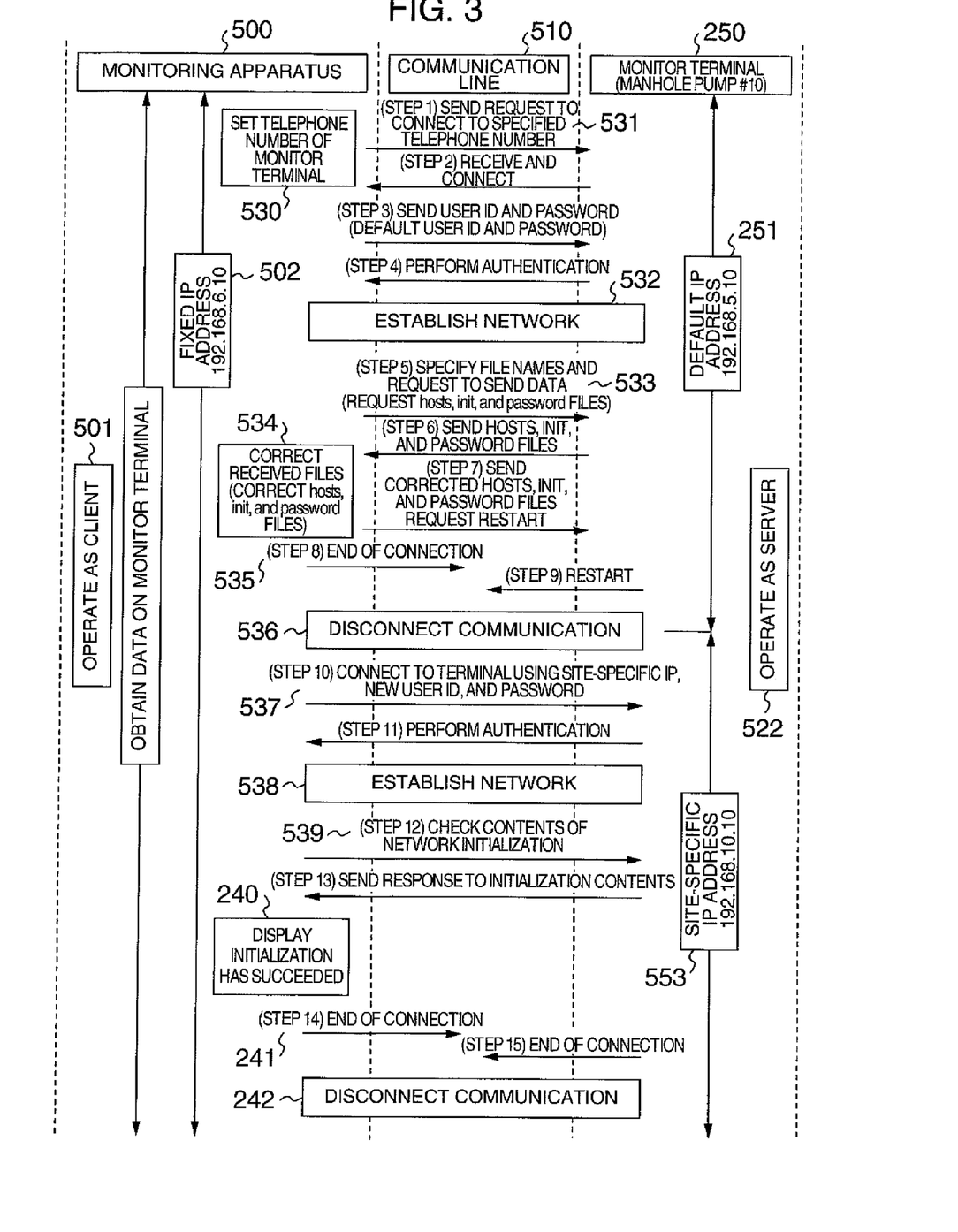
FIG. 3 shows the procedure for initialization.

In the processing in FIG. 3, the monitoring apparatus 111 operates as a client and the monitor terminal 143 operates as a server.

The reason why the client and the server are assigned as described above is as follows. That is, if, at factory shipment time, a predetermined common user ID/password are registered with each of a plurality of monitor terminals to be connected to the monitoring apparatus via the communication line, the merit is that the user ID/password, which are sent when the monitoring apparatus is going to connect to a monitor terminal as a client, need not be changed according to each monitor terminal but the user ID/password registered in advance can be used for any monitor terminal. The user ID and the password used in this stage are temporary ones used only during the initialization, and this merit increases the work efficiency of the initialization. After the initialization, a formal user ID and a formal password are set as shown in step 10.

(Step 5) The monitoring apparatus requests the monitor terminal to send three files (hosts, linux.ini, passwd). These files contain data on the IP address, net mask, broadcast address, host name, user ID, and password used to set a communication condition.

(Step 6) The monitor terminal sends the three files described above to the monitoring apparatus in response to the file transmission request from the monitoring apparatus 111.

(Step 7) The monitoring apparatus rewrites the default IP address, which is set in the received hosts and linux.ini at factory shipment time, to an individual IP address that is set for each installation site. To increase the security between the monitoring apparatus and the monitor terminal, the user ID and password stored in advance may be changed from the user ID and the password registered in advance at factory shipment time to a user ID and a password uniquely provided for each user that uses the monitor terminal.

(Step 8) The monitoring apparatus requests the monitor terminal to restart operation.

(Step 9) In response to the restart request, the monitor terminal disconnects the telephone line and restarts operation based on the new conditions sent from the monitoring apparatus in step 7. The monitoring apparatus can also confirm that the monitor terminal has restarted operation by detecting that the telephone line is disconnected after the restart request.

(Step 10) After the telephone line is disconnected from the monitor terminal, the monitoring apparatus starts operation to check whether the setting conditions in the monitor terminal is correct or not. To do so, the monitoring apparatus performs step 10-step 15 again.

(Step 11) When the new user ID and password are correct, the monitor terminal performs authentication.

(Step 12) The monitoring apparatus sends a data transmission request to the monitor terminal to check the contents of the initialization.

(Step 13) When it is found, as a result of step 12, that the setting conditions in the files received from the monitor terminal has been changed to the value rewritten in step 7, the monitoring apparatus determines that the processing has been performed normally and displays a message on the monitoring apparatus screen to indicate that the processing has been performed normally. On the other hand, when the setting is not changed to the value rewritten in step 7, the monitoring apparatus determines that the processing has been performed abnormally, displays a message on the monitoring apparatus screen to indicate that the processing has been performed abnormally, and displays the contents, such as a message recommending that the initial communication environment setting be performed again, on the screen.

(Step 14) After displaying a message on the monitoring apparatus in step 13 to indicate whether the processing is normal or abnormal, the monitoring apparatus ends the communication with the monitor terminal.

(Step 15) The monitor terminal detects time out, that is communication data has not been received from the monitoring apparatus for a long time and ends the connection.

Although the processing of step 10 and the following steps are all performed automatically in the above description, it is also possible to perform the processing in step 10 and the following steps manually according to the user's determination. This is because, when connecting the monitoring apparatus and the monitor terminal for the first time, the processing between them is not always performed as expected in many cases and it is sometimes inconvenient to do all the processing automatically.

TABLE 1

TELEPHONE NUMBER LIST

| No. | MONITOR TERMINAL | TELEPHONE NUMBER | DEFAULT IP ADDRESS | | SITE SPECIFIC IP ADDRESS |
|---|---|---|---|---|---|
| 1 | MONITOR TERMINAL 1 | 0474110000 | 192.168.5.10 | | 192.168.10.10 |
| 2 | MONITOR TERMINAL 2 | 0474110001 | 192.168.5.10 | | 192.168.11.10 |
| 3 | MONITOR TERMINAL 3 | 0474110002 | 192.168.5.10 | ⟹ | 192.168.12.10 |
| 4 | MONITOR TERMINAL 4 | 0474110003 | 192.168.5.10 | | 192.168.13.10 |
| . | . | . | . | | . |
| . | . | . | . | | . |
| . | . | . | . | | . |
| N | MONITOR TERMINAL N | 0474110005 | 192.168.5.10 | | 192.168.(N+9).10 |
| | | 1008 | 1009 | | 1010 |

Table 1 shows how the IP addresses are changed in the embodiment mentioned above, and FIG. 7 shows how the IP addresses are changed before and after installing the monitor terminals.

Table 1 lists the telephone numbers 1008 and the default IP addresses 1009 of the monitor terminals. When the telephone number of a monitor terminal to be initialized is specified for the monitoring apparatus, the monitoring apparatus makes a telephone call to the monitor terminal according to the procedure shown in FIG. 3 and changes the default IP address 192.168.5.10 to the site-specific IP address such as 192.168.10.10. The site-specific IP address is generated by rewriting the address to 192.168.(N+9).10 by the program in the monitoring apparatus where N is the serial number of the monitor terminal.

This means that the communication is initialized simply by setting a telephone number from the monitoring apparatus.

Figure 7:
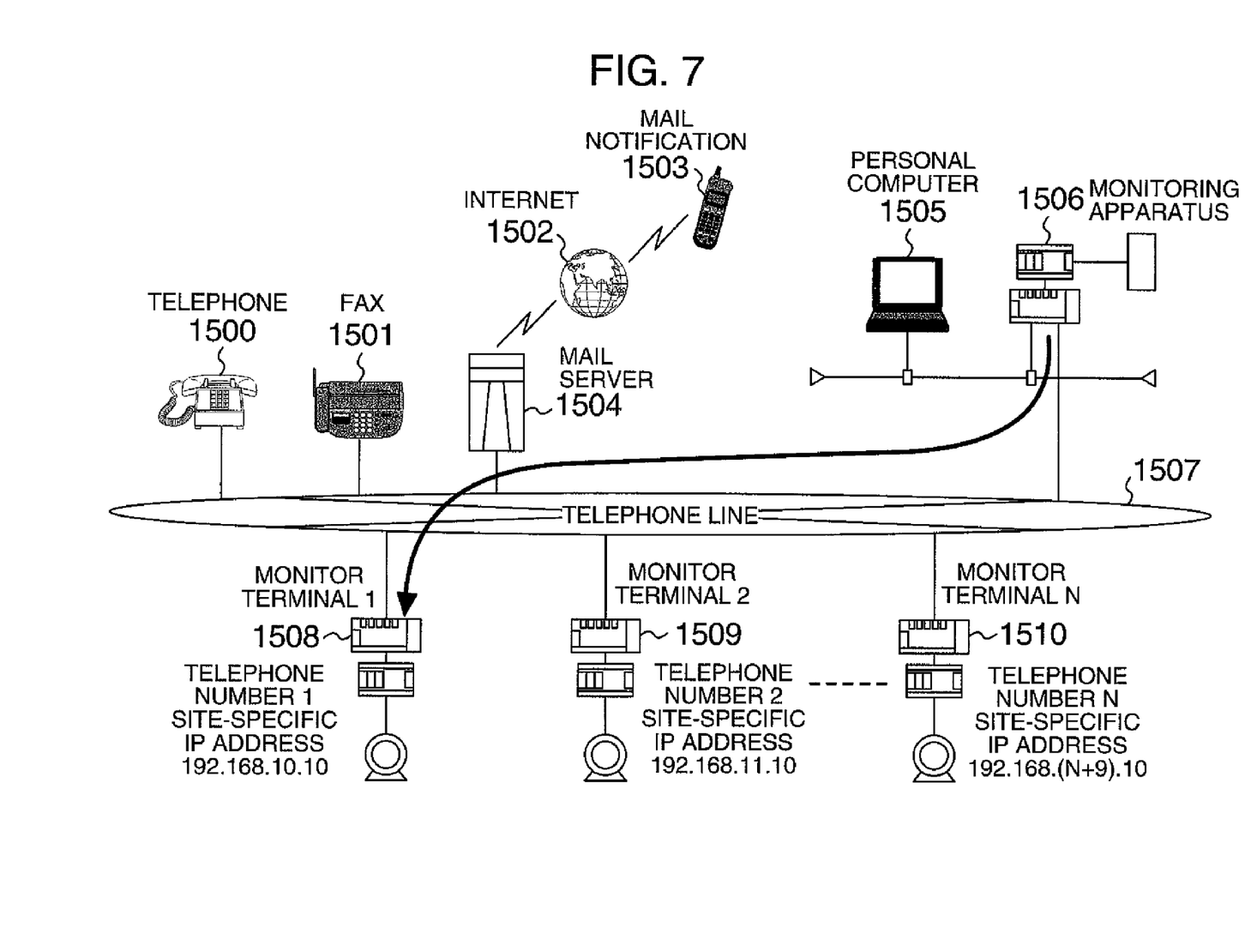
FIG. 7 shows an IP address before and after a monitor terminal is installed.

FIG. 7 is a diagram showing how the setting contents in Table 1 are set up. The monitoring apparatus rewrites the IP addresses of monitor terminal 1-monitor terminal N to the site-specific IP addresses.

The values generated by rewriting the IP addresses need not be 192.168.(N+9).10 described above. It is only required that the IP addresses are to be different among the monitor terminals.

The conventional installation work of a plurality of communication terminals in multiple locations involves complex processing. In addition, when the manhole in the field site is not compatible with the telephone number or the IP address assigned there to the manhole, several problems are generated; for example, the communication test run cannot be made correctly, even the connection cannot be established, or the monitor object processed in the central monitor center is not the actual object in the field site. In particular, when the IP address is incorrect, the telephone line can be connected but, after that, the network cannot be established. The problem in this case is that it is not easy to determine what prevents the network from being established; either the IP address is incorrect or data is not transferred normally because the quality of the communication line is bad. In this case, it is difficult to determine what action to take.

Figure 4:
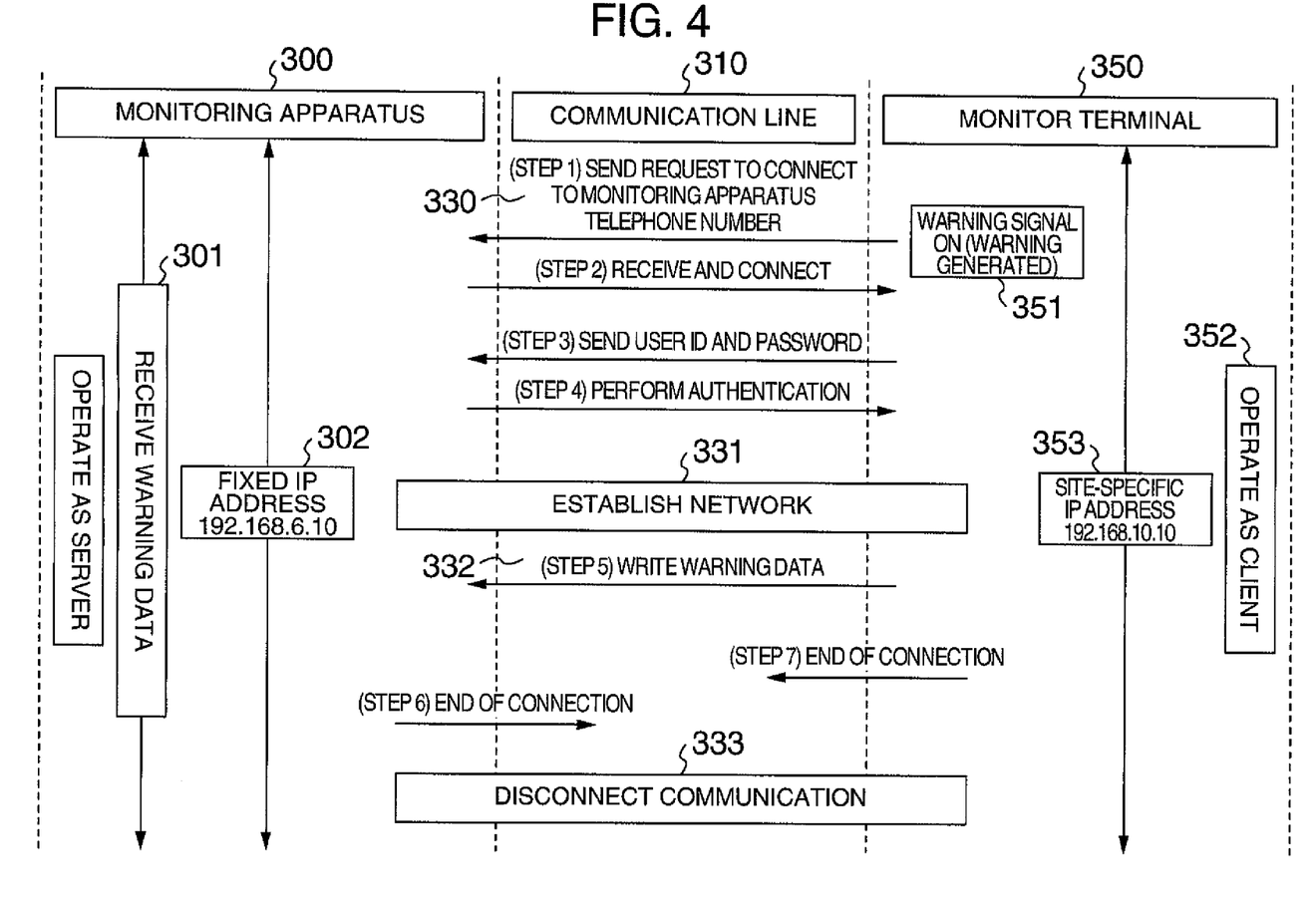
FIG. 4 shows the procedure for warning notification.
Figure 5:
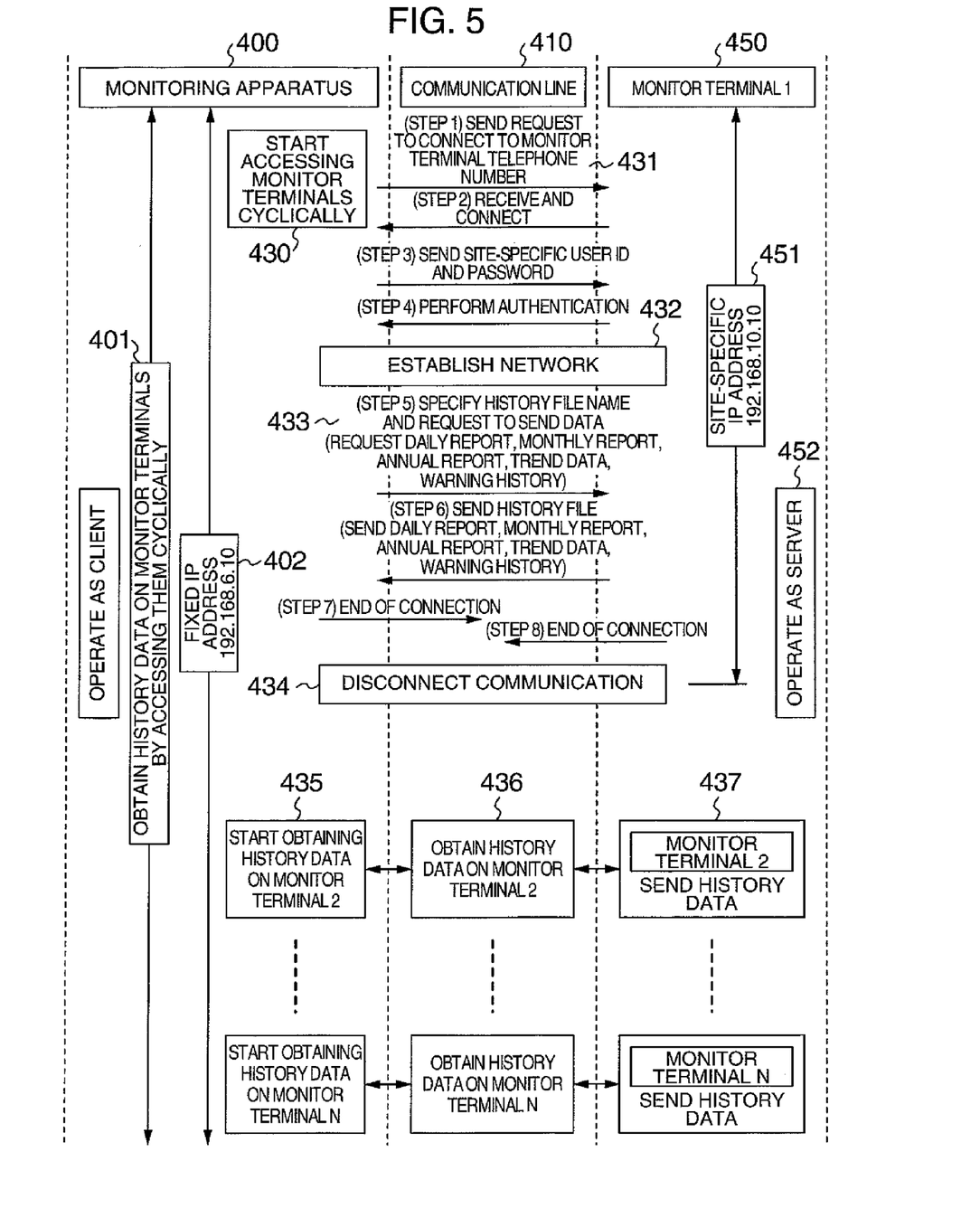
FIG. 5 shows the procedure for obtaining data registered with a monitor terminal.

FIGS. 4-5 show the communication procedures executed after individual IP addresses are set on the monitor terminals. These are normal communication procedures for the monitor system after the initialization of communication is finished.

FIG. 4 shows the warning notification procedure. When the monitor terminal detects the warning signal of the monitor object, the monitor terminal starts communication and writes warning data in the monitoring apparatus. At this time, the monitor terminal communicates with the monitoring apparatus using the IP address that is set individually.

FIG. 5 shows the procedure used by the monitoring apparatus to obtain the history data on the monitor terminals. The monitoring apparatus automatically accesses the monitor terminals cyclically to collect operation history data on the monitor target facility saved in the monitor terminals. The history data includes a daily report, a monthly report, an annual report, trend data, and warning history. The IP address set up individually for each monitor terminal is used for the communication at this time.

Figure 6:
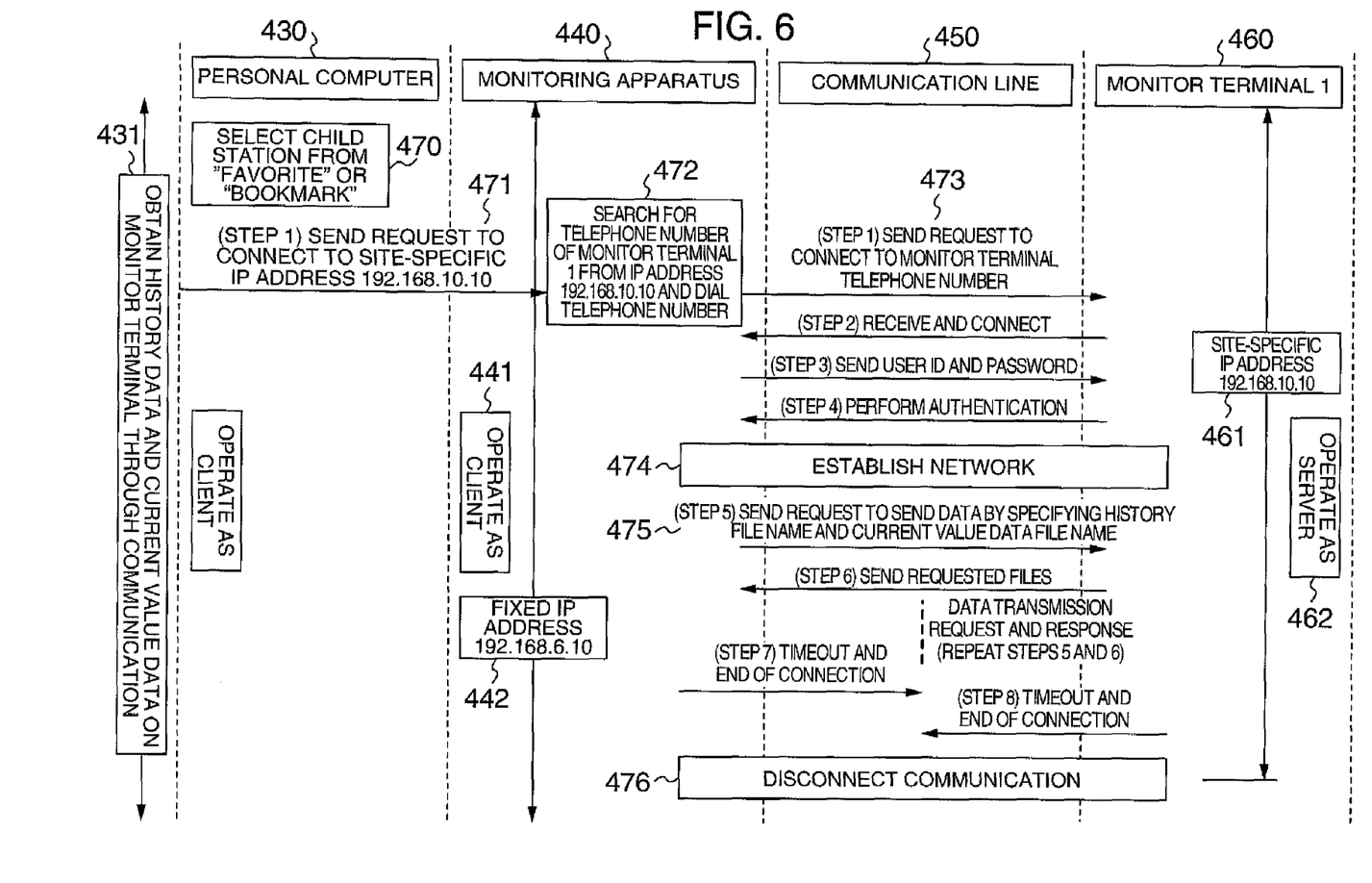
FIG. 6 shows the procedure for establishing a connection from a personal computer to a monitor terminal.

FIG. 6 shows the procedure used by the personal computer to connect to a monitor terminal. The personal computer uses the function of the monitoring apparatus to communicate with the monitor terminal. In this embodiment, the personal computer uses router function of the monitoring apparatus. When the browser is started on the personal computer and the IP address of the monitor terminal is specified as the connection destination, the monitoring apparatus dials the telephone number of the monitor terminal in response to a communication request from the browser to start communication with the monitor terminal. When the communication between the monitoring apparatus and the monitor terminal is established, the personal computer communicates with the monitor terminal via the monitoring apparatus.

In general, the IP address, user ID, and password must be individually set for each communication terminal to manage a monitor system. The embodiment mentioned above allows the monitoring apparatus to automatically set these communication conditions individually for each communication terminal. As a result, the monitoring apparatus uses its own function at test run time to automatically set the communication conditions for the communication terminals. This reduces the manpower, identifies and detects a communication condition setting error that may occur during manual setting, and reduces extra installation work required for correcting the error. This embodiment also eliminates the need for educating and training the field engineers in mastering the IP addresses, user IDs, and passwords and for preparing a tool for setting the communication conditions in the field site.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A system comprising multiple monitoring terminals, each monitoring terminal comprising:
at least one facility monitor device which monitors a monitor object facility;
a storage device which stores information obtained by said at least one facility monitor device;
a communication control device which sends and receives information to and from a monitoring apparatus in a central site via communication; and
a control device which controls at least said at least one facility monitor device, said storage device, and said communication control device, wherein:
in a case that a plurality of monitor terminals are placed in order to monitor a plurality of monitor object facilities, each of said monitor terminals acts as a server relative to the monitoring apparatus acting as a client in setting an initial state, and in establishing a communication with said monitoring apparatus, each of the control device of the plurality of the monitor terminals authenticates by comparing a first communication information being preset and common among the plurality of monitor terminals with a communication information received from said monitoring apparatus, and when these information are coincident the control device establishes the communication;
on the basis of the first communication information, the control device changes a state so that the first communication information is changed to a plurality of second communication information, which are different from said first communication information, and respectively in each of the plurality of the monitor terminals, which is different from each other;
in a monitor-warning communication after setting of the initial state, the monitor terminals act as client relative to the monitoring apparatus acting as server;
each of the control device of the plurality of the monitor terminals transmits each respective second communication information to the monitoring apparatus and receives authentication from the monitoring apparatus and new communication between the monitor terminal and the monitoring apparatus is established; and
the monitor terminal transmits a warning data to the monitoring apparatus after establishment of the communication.

2. The system according to claim 1, wherein said first communication information includes at least one of an IP address, a user ID, and a password.

3. The system according to claim 1, wherein said monitor object facility is a pump which supplies and distributes water and sewerage.

4. The system according to claim 1, wherein said communication control device includes a modem which communicates with said monitoring apparatus via a telephone line, and a communication circuit which connects to a Ethernet.

5. The system according to claim 1, wherein said control device disconnects a communication line and operates restart after establishment of the communication.

6. The system according to claim 1, wherein:
in a case that a plurality of the monitor terminals is placed in order to monitor a plurality of the monitor object facilities, each monitor terminal is set to have a respective unique telephone number; and
said monitoring apparatus calls said unique telephone number in order to set said initial state.

7. The system according to claim 2, wherein:
in a case that a plurality of the monitor terminals is placed in order to monitor a plurality of the monitor object facilities, each monitor terminal is set to have a respective unique telephone number; and
said monitoring apparatus calls said unique telephone number in order to set said initial state.

8. The system according to claim 3, wherein:
in a case that a plurality of the monitor terminals is placed in order to monitor a plurality of the monitor object facilities, each monitor terminal is set to have a respective unique telephone number; and
said monitoring apparatus calls said unique telephone number in order to set said initial state.

9. The system according to claim 4, wherein:
in a case that a plurality of the monitor terminals is placed in order to monitor a plurality of the monitor object facilities, each monitor terminal is set to have a respective unique telephone number; and
said monitoring apparatus calls said unique telephone number in order to set said initial state.

10. The system according to claim 5, wherein:
in a case that a plurality of the monitor terminals is placed in order to monitor a plurality of the monitor object facilities, each monitor terminal is set to have a respective unique telephone number; and
said monitoring apparatus calls said unique telephone number in order to set said initial state.

\* \* \* \* \*